United States Patent
Shimko et al.

(10) Patent No.: US 9,512,677 B2
(45) Date of Patent: Dec. 6, 2016

(54) SYSTEM AND METHOD FOR CREATING LATERAL HEAT TRANSFER APPENDAGES IN A VERTICAL WELL BORE

(71) Applicant: GTherm Inc., Westport, CT (US)

(72) Inventors: Martin A Shimko, Quechee, VT (US);
Michael J Parrella, Sr., Weston, CT (US)

(73) Assignee: GTherm, Inc., Westport, CT (US)

( * ) Notice: Subject to any disclaimer, the term of this patent is extended or adjusted under 35 U.S.C. 154(b) by 227 days.

(21) Appl. No.: 14/202,778

(22) Filed: Mar. 10, 2014

(65) Prior Publication Data

US 2015/0013981 A1 Jan. 15, 2015

Related U.S. Application Data

(60) Provisional application No. 61/774,977, filed on Mar. 8, 2013.

(51) Int. Cl.
*E21B 29/00* (2006.01)
*E21B 43/12* (2006.01)
*E21B 7/06* (2006.01)
*E21B 41/00* (2006.01)
*F24J 3/08* (2006.01)

(52) U.S. Cl.
CPC ............ *E21B 7/061* (2013.01); *E21B 29/002* (2013.01); *E21B 41/0035* (2013.01); *E21B 43/12* (2013.01); *F24J 2003/088* (2013.01)

(58) Field of Classification Search
CPC .... E21B 7/061; E21B 41/0035; E21B 47/024; E21B 43/14; E21B 36/00; E21B 7/04; Y02E 10/125; Y02E 10/16; Y02E 10/12; F24J 3/086; F24J 3/081; F24J 3/08
See application file for complete search history.

(56) References Cited

U.S. PATENT DOCUMENTS 4,047,093 A   9/1977  Levoy
4,051,677 A * 10/1977  Van Huisen ............ F03G 7/04
                                                    165/45

(Continued)

FOREIGN PATENT DOCUMENTS

DE   3217155   7/1983
EP   0178334   4/1986
(Continued)

*Primary Examiner* — Daniel P Stephenson
(74) *Attorney, Agent, or Firm* — Ware, Fressola, Maguire & Barber LLP

(57) ABSTRACT

A process is shown to efficiently drill multiple, short-length, medium-radius lateral holes from a vertical well shaft. The disclosed process may be performed without the need to repeatedly pull down-hole equipment for every lateral hole drilled so as to make the lateral hole drilling process efficient. A heat pipe assembly is shown inserted into each drilled hole. The disclosed drilling and heat pipe insertion may be performed multiple times at a given vertical depth location in the well shaft. The process may be performed without the need to repeatedly pull down-hole equipment for insertion of multiple heat pipes at a same vertical level in the well level for each lateral hole drilled at that level so as to make for an efficient heat pipe insertion process. The described process may be performed multiple times at a large number of vertical depth locations.

5 Claims, 6 Drawing Sheets

(56) References Cited

U.S. PATENT DOCUMENTS

| | | | |
|---|---|---|---|
| 4,557,413 | A | 12/1985 | Lewis et al. |
| 5,109,924 | A | 5/1992 | Jurgens et al. |
| 5,148,877 | A * | 9/1992 | MacGregor ............ E21B 7/061 175/320 |
| 5,467,819 | A * | 11/1995 | Braddick ............... E21B 7/061 166/117.6 |
| 5,488,989 | A * | 2/1996 | Leising .................. E21B 7/061 166/117.6 |
| 5,785,133 | A * | 7/1998 | Murray .................. E21B 7/061 166/117.5 |
| 8,534,069 | B2 | 9/2013 | Parrella |
| 8,616,000 | B2 | 12/2013 | Parrella |
| 8,763,685 | B2 | 7/2014 | Robin |
| 9,091,460 | B2 * | 7/2015 | Parrella, Sr. ............ F24J 3/081 |
| 2002/0070018 | A1 * | 6/2002 | Buyaert ................. E21B 7/061 166/255.3 |
| 2003/0098149 | A1 * | 5/2003 | Wellington ............... E21B 7/04 166/52 |
| 2009/0320475 | A1 * | 12/2009 | Parrella .................... F03G 7/04 60/641.2 |
| 2010/0126729 | A1 * | 5/2010 | Tunget .................. E21B 23/002 166/313 |
| 2010/0270001 | A1 | 10/2010 | Parrella |
| 2010/0270002 | A1 * | 10/2010 | Parrella ................... F24J 3/082 165/45 |
| 2010/0276115 | A1 | 11/2010 | Parrella |
| 2010/0294512 | A1 * | 11/2010 | Assal ..................... E21B 7/061 166/384 |
| 2011/0232858 | A1 * | 9/2011 | Hara ........................ F24J 3/084 165/45 |
| 2013/0020048 | A1 | 1/2013 | Puttke |
| 2013/0306324 | A1 * | 11/2013 | Tunget ................ E21B 41/0035 166/313 |
| 2014/0216760 | A1 * | 8/2014 | Dancer ................... E21B 7/061 166/382 |
| 2014/0311741 | A1 * | 10/2014 | Tunget .................... E21B 23/14 166/285 |
| 2015/0013981 | A1 * | 1/2015 | Shimko ............... E21B 41/0035 166/298 |
| 2015/0021018 | A1 * | 1/2015 | Tunget ................ E21B 41/0007 166/250.01 |
| 2015/0107243 | A1 | 4/2015 | Parrella, Sr. et al. |
| 2015/0159917 | A1 | 6/2015 | Parrella et al. |
| 2015/0163965 | A1 | 6/2015 | Parrella et al. |
| 2015/0292774 | A1 | 10/2015 | Kang et al. |
| 2015/0300327 | A1 * | 10/2015 | Sweatman ............... F24J 3/085 60/641.2 |

FOREIGN PATENT DOCUMENTS

| | | | |
|---|---|---|---|
| WO | 2012050292 | 4/2012 | |
| WO | WO2012151487 A1 * | 11/2012 | ................ F24J 3/08 |

* cited by examiner

SYSTEM AND METHOD FOR CREATING LATERAL HEAT TRANSFER APPENDAGES IN A VERTICAL WELL BORE

BACKGROUND

To effectively harvest heat from a geothermal resource without removing geothermal fluid from the earth a co-pending patent application discloses a down-hole heat exchanger and heat gathering system (filed as Ser. No. 12/456,434, filed 15 Jun. 2009, now U.S. Pat. No. 8,616,000 issued Dec. 31, 2013, which is incorporated by reference in its entirety. The system uses a down-hole heat exchanger and high conductivity "appendages" that radiate radially from the central geothermal well bore that bring the geothermal heat from the far geothermal field into the region adjacent to the down-hole heat exchanger located in the well bore.

SUMMARY

According to the present invention, a method is provided comprising drilling multiple lateral holes from a vertical well shaft using a two-part whipstock to guide the drilling, the two-part whipstock having a stationary anchor part and a rotating part, and inserting a heat pipe assembly into at least one of the drilled multiple lateral holes.

In accordance with the present invention, the drilling of multiple holes may comprise drilling at least one hole at a plurality of vertical depths in the well shaft.

In further accord with the present invention, the drilling of the multiple holes may be carried out without pulling down-hole drilling equipment for every lateral hole drilled.

In still further accord with the present invention, the drilling of the multiple lateral holes may be carried out multiple times at a number of vertical depth locations.

The process disclosed in this document shows a methodology that is capable of efficiently drilling multiple, short-length, medium-radius lateral holes from a vertical well shaft.

The disclosed process may be performed without the need to repeatedly pull down-hole equipment for every lateral hole drilled so as to make the lateral hole drilling process efficient.

The disclosed process shows insertion of a heat pipe assembly into at least one drilled hole at a given vertical depth location.

The disclosed process of insertion of at least one heat pipe assembly into at least one hole at a given vertical depth location may be performed multiple times at various vertical depth locations.

The disclosed process may be performed without the need to repeatedly pull down-hole equipment for insertion of multiple heat pipes at a same vertical level in the well level for each lateral hole drilled at that level so as to make for an efficient heat pipe insertion process.

The described process may be performed multiple times at a large number of vertical depth locations.

According to a further aspect of the invention, any heat or fluid conducting apparatus may inserted into a drilled hole. Such may be inserted instead of a heat pipe or in addition to a heat pipe.

DETAILED DESCRIPTION

The scope of the invention is not intended to be limited to any particular dimension of any particular component or any dimensional relationship between any particular components. Any dimensions disclosed herein are merely provided by way of example. Embodiments are envisioned, and the scope of the invention is intended to include other embodiments having other types or kinds of dimensions of components or dimensional relationships between any particular components, consistent with that disclosed herein, and within the spirit of the underlying invention. For example, one skilled in the art would appreciate and understand without undue experimentation how to configure and dimension the components herein to implement the present invention, consistent with that disclosed herein.

A. Purpose

Figure 1:
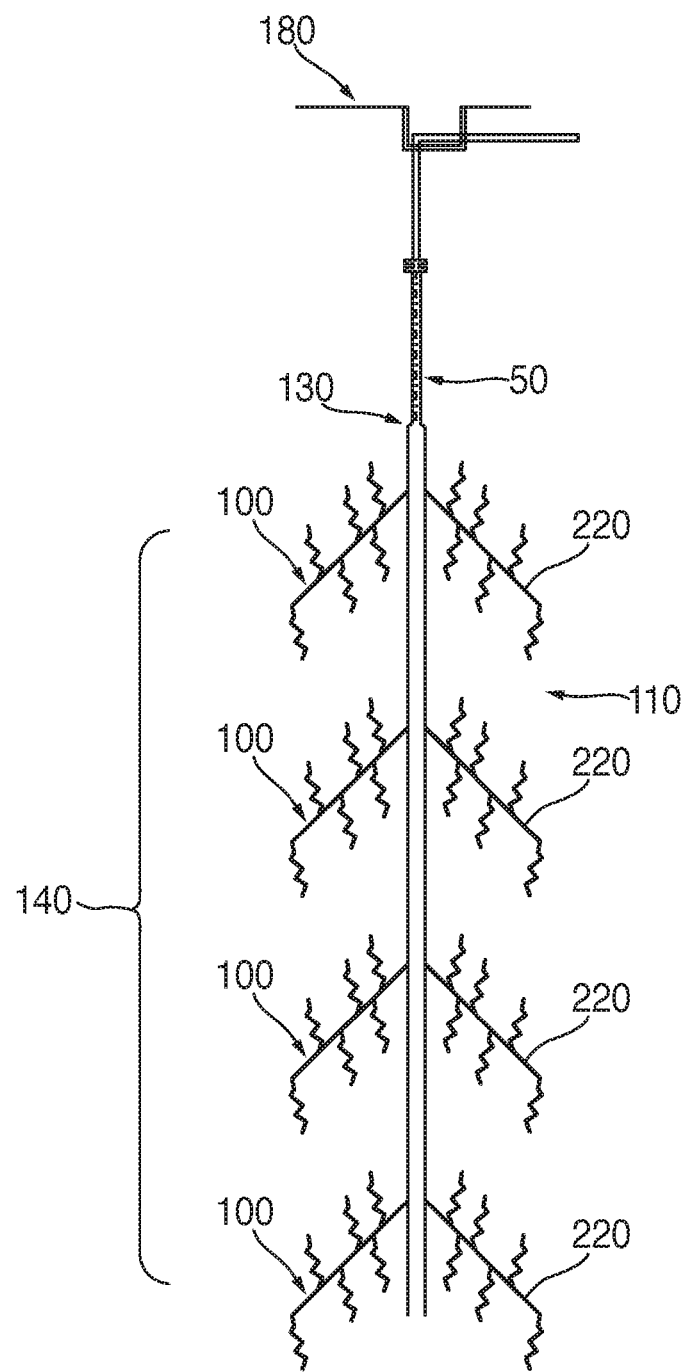
FIG. 1 shows a cross-sectional view of a well and heat nest with appendages according to one embodiment of the present invention.

FIG. 1 illustrates a cross-sectional, conceptual view of a well with a heat harvesting component connected by a piping system 50 to an electricity generating component (not shown) that may be located above ground 180. For example, a heat exchanging unit is shown in the first figure of the abovementioned co-pending application Ser. No. 12/456, 434 connected by a piping system to an electricity generating component via a pumping mechanism. The particular heat exchanging unit is shown in the aforementioned application situated in a heat nest, like a heat nest 140 in FIG. 1 hereof, at the lower end of the well. Several lateral holes are shown nest in the co-pending application, like holes 220 shown in FIG. 1, drilled into rock surrounding the heat. It is disclosed therein that the several lateral holes may be filled with additional heat conductive materials 100 and that the additional materials may include at least one of ball bearing, or at least one bead, or wire, or a meshed metallic material, pipes, or some combination thereof. The flow of geothermal heat from the surrounding rock into the heat exchanging element can be increased via the additional heat conductive material, according to the aforementioned co-pending application.

According to the teachings of the present invention, several holes 220 are drilled in a well 110 by a process disclosed in detail below.

Besides the heat exchanging unit disclosed in the co-pending application, any other suitable heat exchanging unit, such as a pair of concentric pipes extending from the bottom of the well to a "heat point" 130 at the top end of the heat nest 140 may be used according to the teachings hereof. A lowest depth where a first appropriate heat is encountered may be referred to as a "heat point," although it is understood that there is geothermal heat at many levels and this geothermal heat becomes greater as the depth of the well 110 increases. The area between the heat point 130 and the bottom (not shown) of the well 110 is called the heat nest 140.

B. Process Summary

The description that follows shows drilling multiple lateral holes from a vertical well shaft, and inserting a heat pipe assembly into each drilled hole. As known, a heat pipe is a heat-transfer device that combines the principles of both thermal conductivity and phase transition to efficiently manage the transfer of heat between two solid interfaces. A typical heat pipe consists of a sealed pipe or tube made of a material that is compatible with the working fluid. Typically, a vacuum pump is used to remove the air from the empty heat pipe. The heat pipe is partially filled with a working fluid and then sealed. The working fluid mass is chosen so that the heat pipe contains both vapor and liquid over the operating temperature range.

Figure 2A:
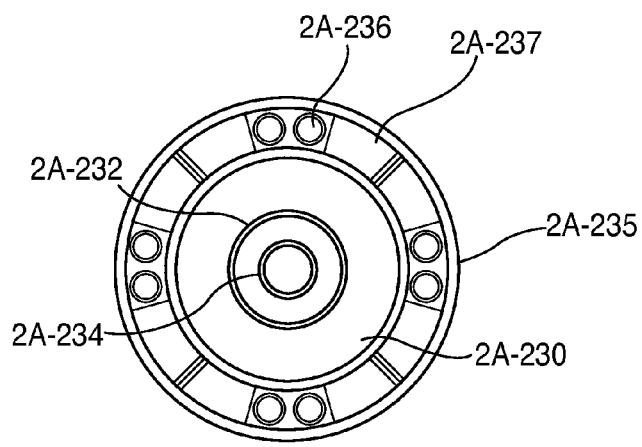
FIG. 2A shows a plan view and FIG. 2B shows a sectional view of an appendage drilling apparatus according to an embodiment.
Figure 2B:
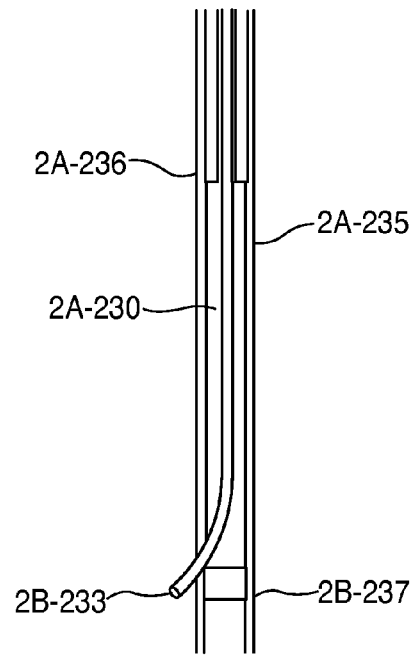

According to the process disclosed herein, work may be performed with a "Drilling Rig" or an adequately sized "Work-Over Rig" with mud circulation capability in conjunction with a "Coiled Tubing Rig." FIGS. 2A and 2B show the major components of a system that implements the process is shown along with their positioning in the well bore. After the main well bore is complete, a two part whipstock 2A-230 (stationary anchor and rotating guide) is attached to an initial mounting ring and lowered into the well using a working string 2A-232. Once anchored in place, a lateral drilling apparatus (several versions can be used including a drill bit 2B-233) lowered into the well by a coil string 2A-234 inside the working string 2A-232 and guided by the whipstock 2A-230 to drill a lateral hole 220. Once completed, the coil tubing 2A-234 is retracted far enough for the drill bit 2B-233 of the drilling apparatus to clear the stationary section of the whipstock 2A-230, and the rotating portion is used to reposition the drill guide circumferentially to drill the next lateral hole. This is repeated until a desired number of lateral holes have been drilled at a given vertical location in the well bore 2A-235. In FIG. 2A a pair of lateral holes may be drilled at each of four positions separated circumferentially by ninety degrees. During the drilling process (or before moving to a next vertical level in the well) a heat pipe assembly consisting of multiple heat pipes 2A-236, thermal distribution fins, stabilizing rings, and a "top ring" apparatus 2A-237 that mounts to the stationary whipstock and guides the ends of the subsequent heat pipe assembly into position over the drilled lateral holes for insertion is lowered into the well on cables. This assembly surrounds the working string and whipstock in a tubular and ring configuration. Upon completion of drilling the lateral holes at one vertical location, the whipstock disengages from the starting anchor and is raised up to reengage with the "top ring" apparatus on the heat pipe assembly that was just lowered into the well. The whipstock and weighted working string is then lowered to drive the heat pipes in the assembly into the drilled lateral holes. Upon completion of the insertion, the drilling process is repeated, followed by the heat pipe insertion process. This is repeated until all of the heat pipe assemblies have been placed in the well.

C. Process Sequence

Figure 3:
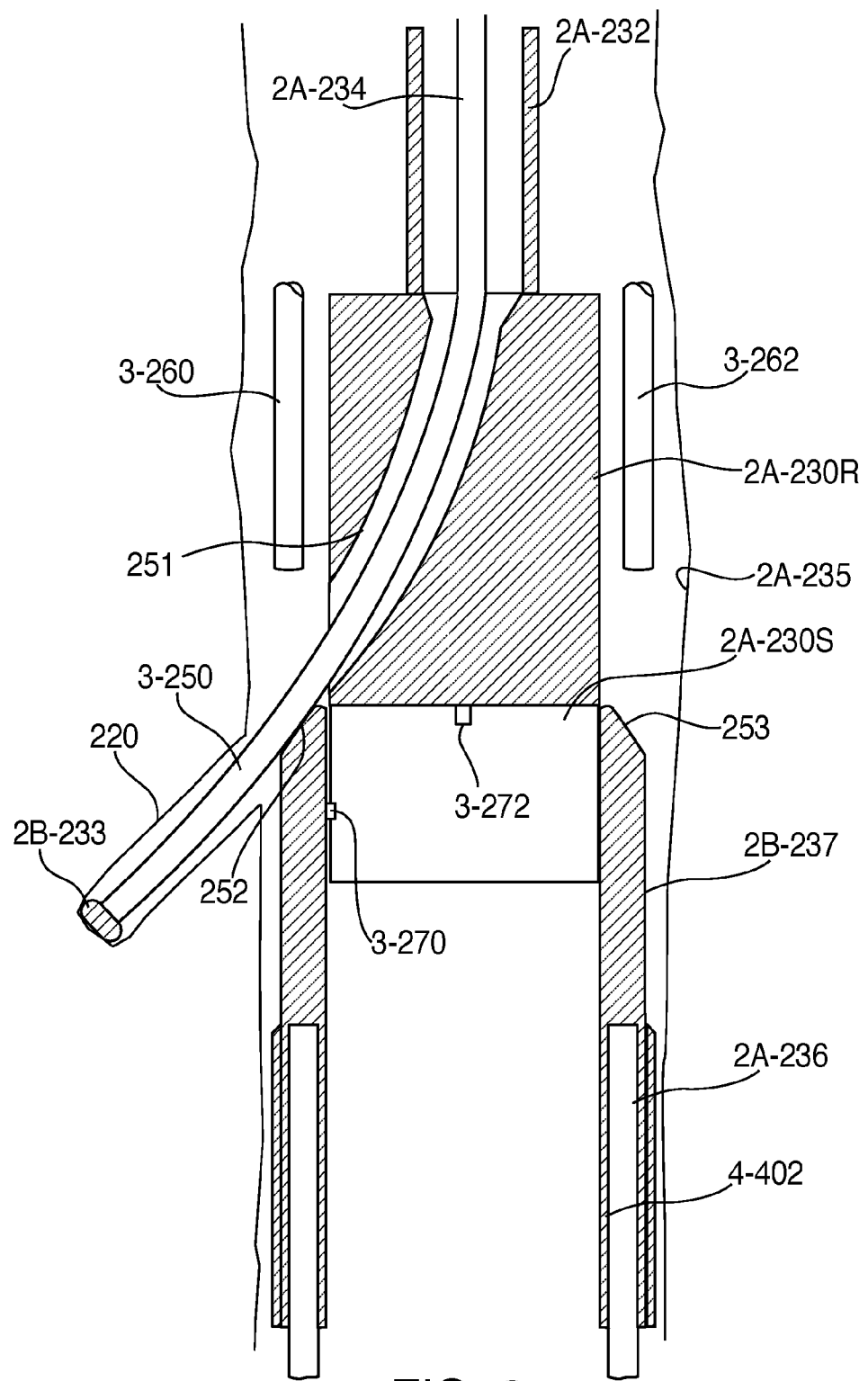
FIG. 3 shows sectional details of an appendage drilling apparatus according to an embodiment.

The steps in the following sequence are exemplary only (refer to FIGS. 1-3) and, given the teachings hereof, variations in the sequence including changes in sequence, omissions, and additions depending on the circumstances of an individual well or class of well will be readily apparent to those of skill in the art.

1. Whipstock 2A-230 is positioned and anchored to heat pipe assembly "starter ring"
    a. Whipstock 2A-230 may thus first be lowered using a working string 2A-232 to lowest desired heat pipe vertical location
    b. The "starter ring" (not shown) is anchored (open hole or to slotted liner) at desired vertical location
2. The drill head assembly including a drill motor 3-250 and the drill bit 2B-233 is lowered on coil tubing 2A-234 into hole through the working string 2A-232
3. A sloping guide 251 in a rotating section 2A-230R of the two-part whipstock 2A-230 positions the drill bit 2B-233 to a drill guide path exit or hole in the rotating part 2A-230R shown in FIG. 3 above the stationary part 2A-230S of the two-part whipstock (could also be the abovementioned "starter ring" or a subsequent "top" ring 2B-237 positioned adjacent the stationary whipstock 2A-230S at the illustrated vertical level or at another vertical level in the well) and then guided by a beveled guide or comparable surface 252 of the heat pipe assembly top ring 2B-237
4. Individual hole (appendage) 220 drilled (e.g. one hundred and twenty feet long so as to fit part of the length of a heat pipe)
5. Drilling apparatus is raised until the drill bit clears the stationary whipstock
6. Upper part of the whip-stock rotates 90° (or other appropriate angle) to align with next drill path hole
7. Process is repeated until all appendage paths have been drilled at that vertical level
8. Heat pipe assembly 3-260, 3-262 is lowered into the well on cables (during appendage drilling process)
9. Beveled guides 252, 253 on the "starter ring" guide the heat pipes 3-260, 3-262 into the start of the respective drilled appendage paths 220
10. The drilling assembly is pulled via the coiled tube so that several sections of working string can be removed (This may only need to occur every other level for a taller masted rig)
11. The whip-stock is disengaged from the "starter ring" and raised until it engages with the "top ring" on the lowered heat pipe assembly (the "top ring" acts like the previously mentioned "starter ring")
12. Weight is put on the whipstock assembly and the heat pipes are "driven" into the drilled appendage paths as far as possible
    a. Until the lower heat pipe assembly contacts the "starter ring", or
    b. Insertion is stopped due to a blocked appendage path
13. The drilling assembly is lowered by the coiled tube inside the working string
14. The drilling and insertion process is repeated at each desired vertical location
15. Vertical spacing is set by the length of heat pipe left in the main well bore (with a designed minimum) and the designed length of heat pipe assembly "top ring"

D. Appendage Drilling

The appendages can be drilled by a number of mechanisms, but one such mechanism will be described here as an example. The appendages are drilled by a mud motor assembly with a predefined drilling arc. This assembly is fed through the working string into the guide path in the rotating whipstock. Drilling mud is circulated through the mud motor causing rotation of the drill bit. Drilling mud flows out the end of the drill bit and back up the annular region between the mud motor and drilled hole sweeping the cutting out of the drilled lateral hole. The vertical location of the drilling assembly is quickly and easily controlled by the coil tube drilling unit at the surface.

E. Whipstock Description

The whipstock 2A-230 will enable the above described process for lateral appendage creation and heat pipe insertion, and if required final cementing. The stationary section 2A-230S of the whipstock will set and hold its vertical and radial position for the entire process of drilling the appendages at one vertical location (multiple lateral holes), inserting the heat pipes, and, if required, cementing the heat pipe into the lateral hole. Open hole whipstocks are available on the market, but a custom design is required for the process disclosed herein. As shown above in FIG. 3, the whipstock 2A-230 will include two parts or sections: (1) the fixed section 2A-230S that will anchor to the tubing string 2A-232 and also contain locking mechanisms (anchors) 3-270, 3-272 that are controllable from the surface, and (2) the rotating section 2A-230R that aligns the drilling assembly with the desired drill path location on the stationary section 2A-230S (with locking mechanism 3-270 locked and locking mechanism 3-272 unlocked during alignment but both locked during drilling). A separate whipstock will be needed for each well and drill diameter set, and whether a slotted liner is required in the "hot zone" because of well bore stability issues.

After the completion of an appendage drilling and heat pipe insertion sequence, the anchor 3-270 is released and the whipstock is raised to the next vertical location (e.g. ≈45 feet) by the working string. The process is then repeated until all of the appendages have been completed.

F. Heat Pipe Description

Figure 4:
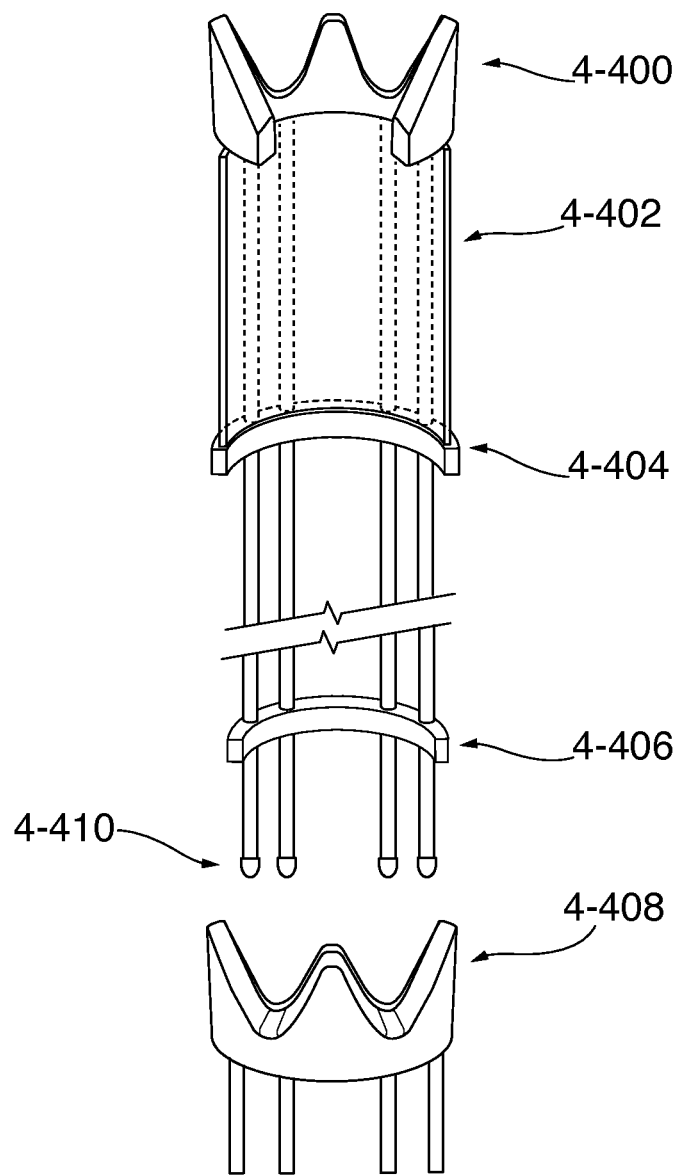
FIG. 4 shows details of parts including top rings used in alignment of heat pipes according to an embodiment.

Originally developed for the aerospace industry (transporting heat to a remote radiator outside of a spacecraft), heat pipes have become a staple in the electronics cooling industry, where point sources of heat inside the unit need to be transported to external cooling fins. Heat pipes operate by containing a fluid that evaporates at the warm end of the heat pipe and condenses at the cooler end. Liquid return to the warm end can be either gravity or capillary driven. Apparent thermal conductivities several orders of magnitude higher than the most conductive metals can be achieved at a fraction of the weight. The heat pipes envisioned for this invention are described below:

- 1¾ inch diameter heat pipe tube is typical (size may vary from ½ to 4 inches in diameter)
- Preliminary results indicate up to 30 kWth may be transported along each 1¾ inch appendage
- Heat pipe length of 120 ft or more is easily achieved
- Water will work nicely as working fluid (but other fluids can be used)
- 5 to 45 degree angle from horizontal at the "far end" of the heat pipe
- Significant wall thickness is used due to high external pressure at depth
- Material selection considers both internal outgassing and external corrosive attack
- Flexibility is sufficient for bending upon insertion G. Heat Pipe Assembly Description The heat pipe assembly can be designed specifically for the drilling process used and the heat pipe diameter and clustering for a given well and geothermal resource. As shown in the example of FIG. 4, the assembly may have a top ring 4-400 (which can be metal, ceramic, or plastic) to which multiple heat pipes are connected and extend downward at a fixed radial and circumferential position. The top portion of the heat pipes may be connected (welded) to a thermal transfer fin 4-402 that is in a tubular configuration. This fin enables effective heat transfer to the central downhole heat exchanger e.g. described in the afore-mentioned co-pending application Ser. No. 12/456,434 (that is inserted into the well after completion of the heat pipe assembly insertions). Several sliding stabilizing rings 4-406 will also be placed at intervals along the downwardly extending heat pipes to prevent buckling during the insertion process. These stabilizers slide up the heat pipes during the insertion process via contact with the top ring 4-408 of the lower heat pipe assembly. As mentioned, once positioned properly, the ring 4-400 stays permanently in place to stabilize the heat pipes.

As described above, the top ring of the heat pipe assembly has slanted surfaces in both the circumferential and radial directions that guide the ends of the heat pipes from the next assembly into the lateral holes that have just been drilled. If a heat pipe cluster is to be inserted into a lateral hole, then a "nose cone" assembly 4-410 joins the cluster shown at the lower end of FIG. 4. This ring 4-408 also has the receptacle for the locking mechanism 3-270 (see FIG. 3) that engages with the stationary whipstock 2A-230S.

Figure 5:
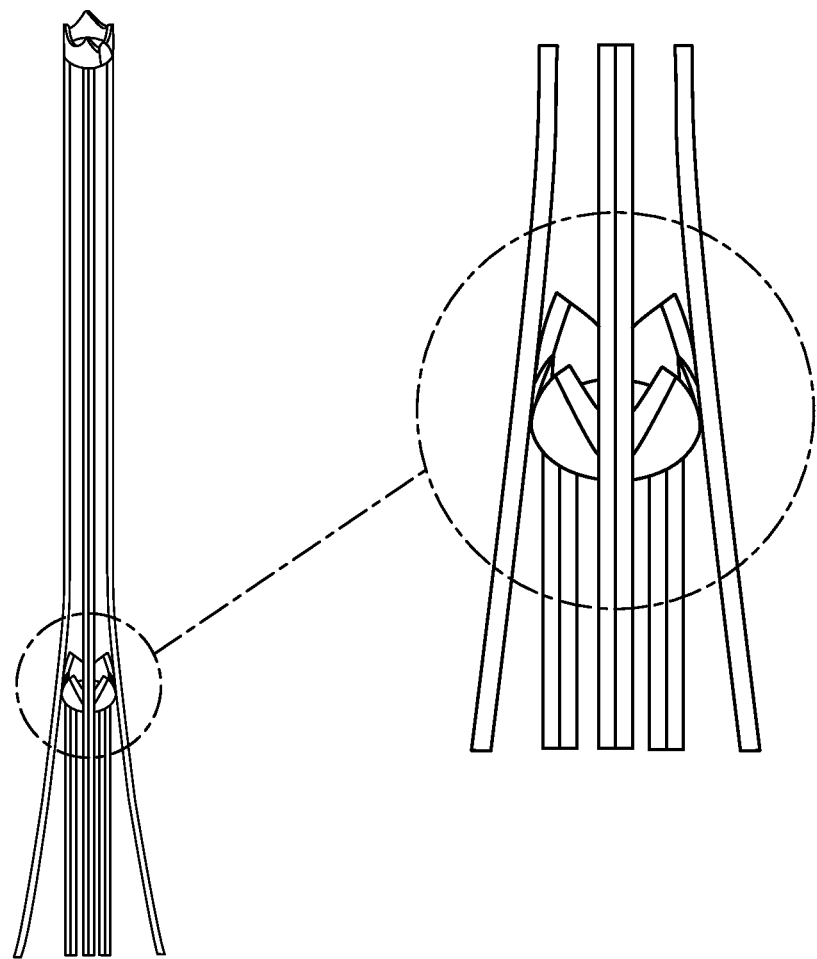
FIG. 5 shows heat pipe apparatus and details of heat pipe insertion.

FIG. 5 shows an elongated illustration of a heat pipe apparatus with the heat pipe insertion apparatus shown enlarged to the right.

H. Create Appendages at Two Vertical Levels with Four Heat Pipe Pairs

Figure 6:
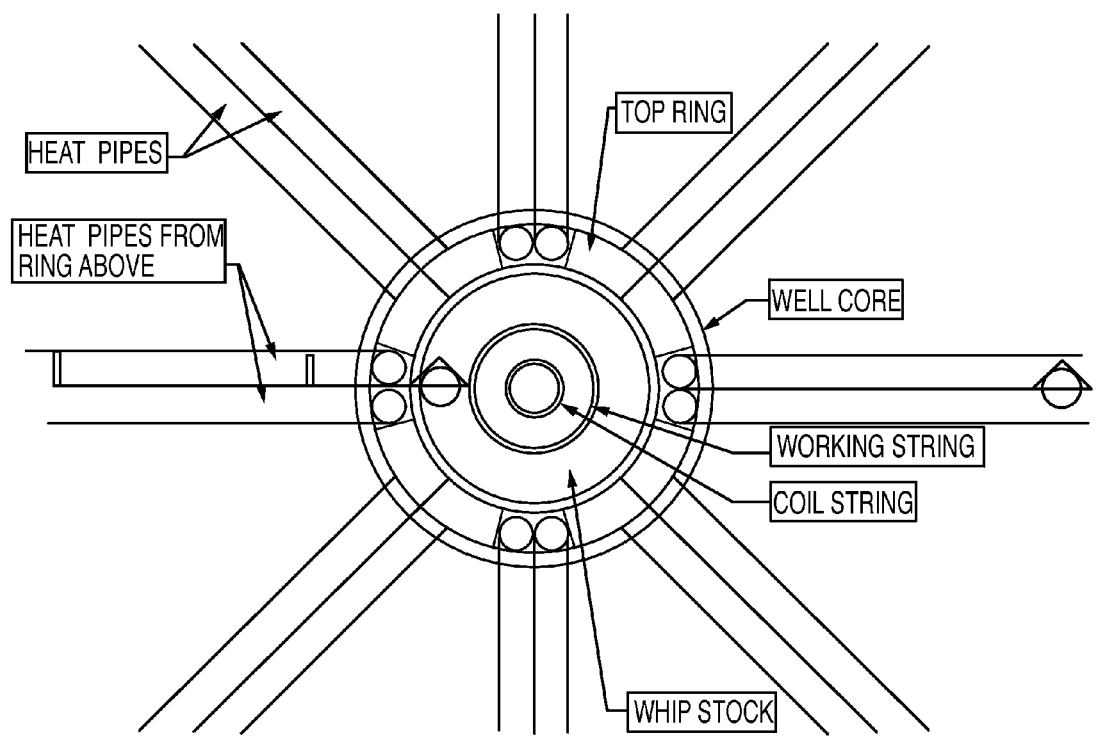
FIG. 6 shows an exemplary cross-section of four pipe pairs drilled at ninety degree angles at one level and four pipe pairs drilled at ninety degree angles at another level but rotated at forty-five degrees with respect to each other at the two levels.

FIG. 6 is an exemplary plan view of the entire assembly after heat pipe insertion with four pairs of heat pipes at each of two exemplary vertical levels in the well with a forty-five degree rotation of the appendages between levels. As before, work is performed using, in combination, an adequately-sized Work-Over Rig with mud circulation capability and a Coiled-Tubing Feed Rig. The dimensions can be any appropriate dimensions. For a particular example such as shown in FIG. 6, the well bore might be 17.5 inches in diameter and the pairs of heat pipes positioned in a circular pattern separated by ninety degrees around an inner diameter of 14 inches.

I. Alternative Process Summary

- Whipstock is positioned and anchored
  - Whipstock is lowered using an anchoring pipe string to bottom of well
  - Fixed section of whipstock anchored to central pipe at vertical location and angular orientation
  - Inflatable anchoring system sets radial position
- Flexible drive train lowered into hole
- Guide in rotating section of whipstock positions drill bit on whipstock guide surface
- Individual appendage drilled with top-driven, flexible drill apparatus
- Drilling apparatus is raised until the drill bit clears the stationary whipstock
- Upper part of the whip-stock rotates 180° to rotate drill string clear
- Heat pipe are lowered down hole via coiled tubing (during appendage drilling)
- Whipstock guides heat pipe into drilled appendage path and grout feed tube
- If heat pipe is grouted, the coiled tubing is used to feed grout using a tremie technique to fill voids in non-aqueous environments
- Coil tubing is retracted to top of well
- Whipstock inflatable anchor is released
- Whipstock raised to next height (~25 feet) and rotated 90°

J. Additional or Alternative Material

As will be appreciated from the foregoing, it is contemplated that one or more heat pipes be inserted in corresponding appendages as an effective heat transfer mechanism to transfer heat from the rock surrounding the appendages to the heat exchanger in the heat nest. However, it should be realized that instead of or in addition to inserting heat pipes in the appendages drilled according to the two part whipstock method of the present invention, any heat or fluid conducting apparatus may inserted into a drilled hole. Such materials may include at least one of ball bearing, or at least one bead, or wire, or a meshed metallic material, pipes, or some combination thereof. As said, such may be may be inserted instead of a heat pipe or in addition to a heat pipe.

The invention claimed is:

1. A method, comprising:
   drilling multiple lateral holes from a vertical well shaft at a number of vertical depth locations using a two-part whipstock to guide the drilling, the two-part whipstock having a stationary part and a rotating part, wherein the drilling of the multiple lateral holes is performed without pulling down-hole drilling equipment for every lateral hole drilled, and
   inserting a heat pipe assembly into at least one of the drilled multiple lateral holes.

2. The method of claim 1, wherein the drilling of the multiple lateral holes is performed multiple times at a number of vertical depth locations.

3. The method of claim 1, comprising inserting any heat or fluid conducting material or apparatus into any one or more of the multiple drilled lateral holes.

4. The method of claim 1, wherein the heat pipe assembly inserted into the at least one of the drilled multiple lateral holes comprises one or more heat pipes.

5. The method of claim 1, wherein the drilling of multiple lateral holes is repeated at multiple vertical locations without removing the drilling assembly from the well bore.

* * * * *